United States Patent
Zhao (10) Patent No.: US 12,225,403 B2
(45) Date of Patent: Feb. 11, 2025

(54) FEEDBACK METHOD AND SYSTEM

(71) Applicant: Beijing Xiaomi Mobile Software Co., Ltd., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 343 days.

(21) Appl. No.: 17/596,890

(22) PCT Filed: Jun. 25, 2019

(86) PCT No.: PCT/CN2019/092835
§ 371 (c)(1),
(2) Date: Dec. 20, 2021

(87) PCT Pub. No.: WO2020/258040
PCT Pub. Date: Dec. 30, 2020

(65) Prior Publication Data
US 2022/0322133 A1    Oct. 6, 2022

(51) Int. Cl.
*H04W 28/02* (2009.01)
*H04L 1/16* (2023.01)
*H04W 28/04* (2009.01)
*H04W 28/24* (2009.01)

(52) U.S. Cl.
CPC ........... *H04W 28/0268* (2013.01); *H04L 1/16* (2013.01); *H04W 28/0226* (2013.01); *H04W 28/04* (2013.01); *H04W 28/24* (2013.01)

(58) Field of Classification Search
CPC ........ H04W 28/0268; H04W 28/0226; H04W 28/04; H04W 28/24; H04L 1/16
USPC .......................................... 370/310, 328, 329
See application file for complete search history.

(56) References Cited

U.S. PATENT DOCUMENTS

| | | | |
|---|---|---|---|
| 8,254,315 B2* | 8/2012 | Suzuki | H04L 1/0015 370/473 |
| 10,945,102 B2* | 3/2021 | Ryoo | H04W 4/08 |
| 2018/0367261 A1 | 12/2018 | Gonzalves Serrano et al. | |
| 2019/0174466 A1 | 6/2019 | Zhang et al. | |
| 2020/0366422 A1* | 11/2020 | Nguyen | H04W 4/40 |
| 2021/0243726 A1* | 8/2021 | Osawa | H04W 72/20 |

FOREIGN PATENT DOCUMENTS

| | | |
|---|---|---|
| CN | 101621362 A | 1/2010 |
| CN | 103167521 A | 6/2013 |
| CN | 103607750 A | 2/2014 |
| CN | 106330412 A | 1/2017 |
| CN | 106375062 A | 2/2017 |
| CN | 106464434 A | 2/2017 |
| CN | 107748563 A | 3/2018 |
| CN | 108400843 A | 8/2018 |
| CN | 109194450 A | 1/2019 |
| WO | 2008038104 A2 | 4/2008 |
| WO | 2019109239 A1 | 6/2019 |

* cited by examiner

*Primary Examiner* — Obaidul Huq
(74) *Attorney, Agent, or Firm* — McCoy Russell LLP (57) ABSTRACT

A feedback method, including: determining that a geographical distance between a data receiver and a data transmitter exceeds a quality of service (QoS) communication distance; sending out-of-range feedback information, and the out-of-range feedback information is configured to indicate that the geographical distance between the data receiver and the data transmitter exceeds the QoS communication distance.

20 Claims, 4 Drawing Sheets

FEEDBACK METHOD AND SYSTEM

CROSS REFERENCE TO RELATED APPLICATION

The present application is a U.S. National Phase of International Application No. PCT/CN2019/092835 entitled "FEEDBACK METHOD AND APPARATUS, AND STORAGE MEDIUM," and filed on Jun. 25, 2019. The entire contents of the above-listed application is hereby incorporated by reference for all purposes.

BACKGROUND

Recently, with the development of technologies such as automatic driving, new requirement has been put forward for performance of vehicle to everything (V2X) technology in order to support new V2X service. Utilizing of 5G technology to support new V2x communication services and scenes have been planned as an important content of Rel16 by 3GPP.

SUMMARY

The disclosure provides a feedback method and system.

According to a first aspect of an example of the disclosure, a feedback method is provided, applied to a data receiver, and includes:

determining that a geographical distance between a data receiver and a data transmitter exceeds a quality of service (QoS) communication distance; and sending out-of-range feedback information, and the out-of-range feedback information is configured to indicate that the geographical distance between the data receiver and the data transmitter exceeds the QoS communication distance.

According to a second aspect of an example of the disclosure, a feedback method is provided, applied to a data transmitter, and includes:

detecting out-of-range feedback information, the out-of-range feedback information is configured to indicate that a geographical distance between a data receiver and the data transmitter exceeds a quality of service (QoS) communication distance; and determining whether to resend data according to an out-of-range feedback information detection result.

It should be understood that the above general descriptions and the following detailed descriptions are examples and explanatory only, and are not intended to limit the disclosure.

BRIEF DESCRIPTION OF THE FIGURES

The accompanying drawings, which are incorporated in and constitute a part of this specification, illustrate examples consistent with the disclosure and together with the specification serve to explain the principles of the disclosure.

DETAILED DESCRIPTION

Examples will be described in detail herein, examples of which are illustrated in the accompanying drawings. When the following description refers to the accompanying drawings, the same numbers in different drawings represent the same or similar elements unless otherwise indicated. The implementations described in the following examples do not represent all implementations consistent with the disclosure. On the contrary, they are merely examples of an apparatus and a method consistent with some aspects of the disclosure as detailed in the appended claims.

In new radio (NR) V2X technology, as for unicast and multicast services of direct connection communication, a physical-layer hybrid automatic repeat request (HARQ) feedback retransmission mechanism is supported to be used. As for the unicast service, a data receiver feeds back an acknowledgement (ACK) in the case of correctly receiving data (correctly decoding the data), and feeds back a negative acknowledgement (NACK) in the case of incorrectly receiving the data (an error occurs during data decoding). As for the multicast service, two kinds of HARQ feedback retransmission methods are supported. One method is that the data receiver only feeds back NACK during incorrect receiving, otherwise, the data receiver does not feedback any signal. The other method is that each data receiver feeds back ACK during correct receiving, and feeds back NACK during incorrect receiving.

In the related art, in the case that a geographical distance between a data transmitter and the data receiver exceeds a quality of service (QoS) communication distance, there is no need to guarantee QoS for communication between the data transmitter and the data receiver. In this case, the data receiver does not feedback any signal no matter whether to correctly receive the data, and the data transmitter does not need to resend the data as well. In the case that neither ACK nor NACK is received by the data transmitter, the data transmitter will resend the data so as to guarantee reliability of data transmission. However, the reason that neither ACK nor NACK is received by the data transmitter may be that no data is detected by the data receiver, or feedback information fails to transmit, or the geographical distance between the data transmitter and the data receiver exceeds the QoS communication distance. As for the data transmitter, the reason that neither ACK nor NACK is received cannot be determined, and data resending possibly occurs even if the data does not need to be resent, resulting in resource waste.

A feedback method provided by an example of the disclosure can be applied to a communication scene of direct communication between two equipments, for example, a vehicle wireless communication scene from a vehicle to everything (V2X), and the like, where V represents vehicle-mounted equipment, and X represents any object interacting with the vehicle-mounted equipment. Currently, X mainly contains the vehicle-mounted equipment, handheld equipment, traffic roadside infrastructure and network. Information modes of V2X interaction include: vehicle to vehicle (V2V) interaction, vehicle to infrastructure (V2I) interaction, vehicle to pedestrian (V2P) interaction, and vehicle to network (V2N) interaction. In the disclosure, the communication scene of direct communication between two equipments may also be a communication scene of device to device (D2D). In the example of the disclosure, the equipment for direct communication may include various kinds of equipments which have wireless communication function, such as handheld equipment, vehicle-mounted equipment, wearable equipment, computing equipment or other processing equipment connected to a wireless modem, and all forms of user equipment (UE), a mobile station (MS), a terminal, terminal equipment, and the like. In order to facilitate description, the example of the disclosure is illustrated by taking an example of the scene of direct communication between the vehicle-mounted equipments, and the vehicle-mounted equipments for direct communication include vehicle-mounted equipment serving as a data transmitter and vehicle-mounted equipment serving as a data receiver.

Figure 1:
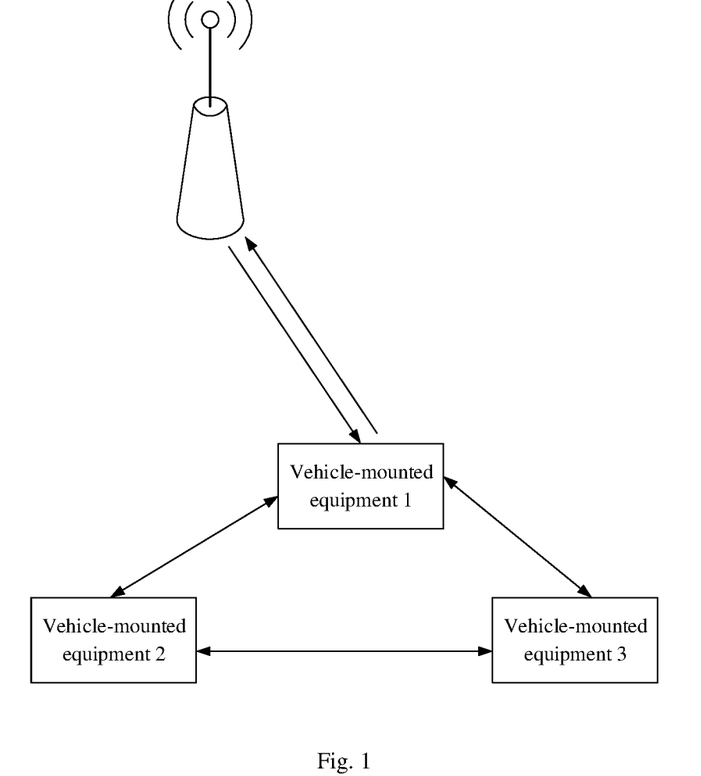
FIG. 1 is a schematic structural diagram of a wireless communication system according to part of examples.

FIG. 1 shows a schematic diagram of the scene of direct communication between the vehicle-mounted equipments, and network equipment configures various transmission parameters for data transmission for the vehicle-mounted equipment 1. The vehicle-mounted equipment 1 serves as the data transmitter, the vehicle-mounted equipment 2 serves as the data receiver, and the vehicle-mounted equipment 1 and the vehicle-mounted equipment 2 are in direct communication. A link for communication between the network equipment and the vehicle-mounted equipments is uplink-downlink, and a link between the vehicle-mounted equipments is a sidelink. In a cellular-vehicle to everything (C-V2X) technology, communication between the vehicle-mounted equipment and other equipment may be transferred through a base station and a core network, that is, an uplink-downlink between the terminal equipment and the base station in an original cellular network is utilized for communication; and communication may also be performed directly through the sidelink between the equipments. Compared with Uu interface communication, sidelink communication has the characteristics of short time delay, small overhead and the like, and is very suitable for direct communication between the vehicle-mounted equipment and other geographically-close peripheral equipment.

V2x sidelink communication in long term evolution (LTE) may only support some basic V2x applications in a security aspect, such as cooperative awareness messages (CAM), or a decentralized environmental notification message (DENM) and other basic safety messages (BSM) for voice broadcast communication. Recently, with the development of technologies such as automatic driving, new requirement has been put forward for performance of V2x technology in order to support new V2x service. Utilizing of 5G NR technology to support new V2x communication service and scene has been planned as an important content of Rel16 by 3GPP. 3GPP SA1 (service requirement) workgroup has established some new service requirements needing to be met by V2x communication, including vehicles platooning management, extended sensors, advanced driving, and remote driving. Generally speaking, the NR V2x sidelink needs to provide higher communication speed, shorter communication delay, and more reliable communication quality.

In the discussion about NR V2x, radio access network (RAN) 1 resolution supports to use physical-layer HARQ feedback retransmission mechanism for unicast and multicast services of direct connection communication. As for the unicast service, the data receiver feeds back an acknowledgement (ACK) in the case of correctly receiving data (correctly decoding the data), and feeds back a negative acknowledgement (NACK) in the case of incorrectly receiving the data (an error occurs during data decoding). As for the multicast service, two kinds of HARQ feedback retransmission methods are supported. One method is that the data receiver only feeds back NACK during incorrect receiving, otherwise, the data receiver does not feedback any signal. The other method is that each data receiver feeds back ACK during correct receiving, and feeds back NACK during incorrect receiving.

Because the service requirement of V2x is closely related to geographical location, QoS of V2x communication contains communication distance (range). According to requirements of RAN2 and SA2, RAN1 is discussing, for the unicast and multicast services, whether to perform HARQ feedback according to geographical distance between the data transmitter and the data receiver. In the case that the geographical distance between the data transmitter and the data receiver exceeds QoS communication distance, communication between the data transmitter and the data receiver does not need to guarantee QoS, and may be performed in a best effort mode. At the moment, the data receiver does not execute an HARQ feedback operation any more, improving resource utilization efficiency and reducing unnecessary retransmission.

Currently, in response to the data receiver feeding back ACK in the case of correctly receiving the data and feeding back NACK in the case of incorrectly receiving the data, three possible feedback receiving cases may occur from the perspective of the data transmitter: 1) ACK is received, 2) NACK is received, or 3) neither ACK nor NACK is received. The three feedback cases correspond to three possible data receiving cases respectively: 1) the data is correctly received by the data receiver, 2) the data is not correctly received by the data receiver, and 3) the data is not detected by a receiving end (for example, because control information is incorrectly received or loses) or feedback information fails to transmit. As for 2) and 3), the data transmitter needs to resend the data so as to guarantee reliability of data transmission.

However, if the data receiver performing the above HARQ feedback can also decide whether to perform HARQ feedback according to geographical distance from the transmitter, the corresponding data receiving case that neither ACK nor NACK is received by the data transmitter is: the data is not detected by the data receiver (for example, because the control information is incorrectly received or loses), the feedback information fails to transmit, or the geographical distance from the data receiver to the data transmitter exceeds the requirements of transmission distance. In the case that the geographical distance from the data receiver to the data transmitter exceeds the requirements of the QoS communication distance, the data transmitter should not resend the data because the data reliability does not need to be guaranteed. However, as for the data transmitter, the reason that neither ACK nor NACK is received cannot be determined, whether to resend the data cannot be judged as well, so data resending possibly occurs even if the data does not need to be resent, resulting in resource waste and behavior disorder of the data transmitter.

For this purpose, the disclosure provides a feedback method. In response to the geographical distance between a data receiver and a data transmitter exceeding a QoS communication distance, out-of-range feedback information is sent, the out-of-range feedback information is detected, and whether to resend data is determined according to an out-of-range feedback information detection result. In the case that the out-of-range feedback information is detected by the data transmitter, it may be determined that the geographical distance between the data receiver and the data transmitter exceeds the QoS communication distance, and the data transmitter may not resend the data, reducing the likelihood of resending the data in the case that the data does not need to be resent.

Figure 2:
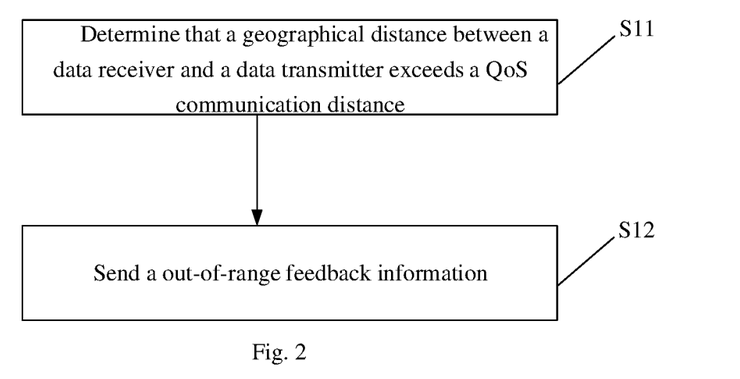
FIG. 2 is a flow diagram of a feedback method according to an example.

FIG. 2 is a flow diagram of a feedback method according to an example. As shown in FIG. 2, the feedback method is applied to a data receiver, and includes the following step S11 and step S12.

In step S11, a geographical distance between the data receiver and a data transmitter is determined, and whether the geographical distance exceeds a QoS communication distance is determined.

In the disclosure, the data receiver may obtain its own geographical location information through its own vehicle-mounted global navigation satellite system (GNSS), such as a global positioning system (GPS) and Beidou. The data transmitter may carry its own geographical location information in control information transmission corresponding to data transmission. For example, the geographical location information of the data transmitter may be explicitly or implicitly carried in control information, for example, carried in a demodulation reference signal (DMRS) sequence. The data receiver may determine the geographical location information of the data transmitter by receiving the control information, and determine the geographical distance between the data receiver and the data transmitter according to the geographical location information of the data receiver and the geographical location information of the data transmitter. After the data receiver determines the geographical distance between the data receiver and the data transmitter, whether the geographical distance exceeds the QoS communication distance may be judged. The QoS communication distance may be pre-configured by a system. In the present disclosure, there are no restrictions on the method of how to calculate the geographical distance by the data receiver and a specific implementation process of judging whether to exceed the QoS communication distance.

In the disclosure, in response to the data receiver determining that the geographical distance between the data receiver and the data transmitter exceeds the QoS communication distance, step S12 is executed.

In step S12, out-of-range feedback information is sent, and the out-of-range feedback information is configured to indicate that the geographical distance between the data receiver and the data transmitter exceeds the QoS communication distance.

In the disclosure, in response to the geographical distance between the data receiver and the data transmitter exceeding the QoS communication distance, the data receiver sends the out-of-range feedback information, and the out-of-range feedback information is configured to indicate that the geographical distance between the data receiver and the data transmitter exceeds the QoS communication distance. The data transmitter receiving the out-of-range feedback information may determine that the geographical distance between the data receiver and the data transmitter exceeds the QoS communication distance, in this case, data resending is not needed, thus, it may be determined that the data does not need to be resent, reducing the likelihood of resending the data in the case that the data does not need to be resent.

An implementation process that the data receiver sends the out-of-range feedback information is illustrated below with reference to actual application in the disclosure.

In one implementation, the out-of-range feedback information may be sent based on a physical layer sequence.

In the disclosure, in the case that a physical direct-connection feedback channel is based on a sequence, the out-of-range feedback information may be sent based on the physical layer sequence.

In the disclosure, the data receiver may check whether to correctly receive the data through cyclic redundancy check (CRC) and perform corresponding feedback. On one hand, in response to the data receiver sending the NACK in the case of incorrectly receiving the data and sending the ACK in the case of correctly receiving the data, out-of-range feedback, ACK and NACK may be distinguished through different physical layer sequences. By distinguishing the out-of-range feedback, ACK and NACK through the different physical layer sequences, the data transmitter receiving the corresponding feedback may distinguish the out-of-range feedback, ACK and NACK and further determine whether to resend the data. On the other hand, in response to the data receiver sending the NACK in the case of incorrectly receiving the data and sending the ACK in the case of correctly receiving the data, the same physical layer sequence as ACK may be configured to indicate the out-of-range feedback, so that the data transmitter receiving the corresponding feedback determines that the data does not need to be resent. On the other hand, in response to the data receiver sending NACK in the case of incorrectly receiving the data and does not send any feedback in the case of correctly receiving the data, the physical layer sequence for sending the out-of-range feedback information is different from the physical layer sequence for sending the NACK.

The above-mentioned different physical layer sequences may be different base sequences, or sequences generated by different cyclic shifts of the same base sequence.

In the disclosure, the physical layer sequences for distinguishing the out-of-range feedback information, ACK and NACK are illustrated by taking an example that the physical layer direct-connection feedback channel reuses an NR uplink physical uplink control channel (PUCCH) format 0. The NR uplink PUCCH format 0 provides a set of (30) different base sequences. Different cyclic shift values of the same physical layer base sequence may be configured to indicate ACK, NACK and the out-of-range feedback information respectively, for example, ACK, NACK and the out-of-range feedback information respectively correspond to cyclic shift sequences with the cyclic shift values being 0, 4 and 9 of the base sequence with a length of 12. In the disclosure, the base sequence with different serial numbers in the set of base sequences may also be configured to indicate the ACK, the NACK and the "out-of-range".

In another implementation, in a case that the physical direct-connection feedback channel is based on a modulation symbol, the out-of-range feedback information may be sent based on a bit value of the modulation symbol.

On one hand, in response to the data receiver sending NACK in the case of incorrectly receiving the data and sending ACK in the case of correctly receiving the data, NACK, ACK and the out-of-range feedback information may be indicated by using the different bit values. For example, "00" and "01" are configured to indicate the NACK and the ACK, and "10" or "11" is configured to indicate the out-of-range feedback information. On the other hand, in response to the data receiver sending NACK in the case of incorrectly receiving the data and sending ACK in the case of correctly receiving the data, the same bit value as the bit value indicating, in the case of the QoS communication distance being not exceeded, the ACK may be configured to indicate the out-of-range feedback information. On the other hand, in a case that the data receiver sends NACK in the case of incorrectly receiving the data and does not send any feedback in the case of correctly receiving the data, the bit value indicating the out-of-range feedback information is different from the bit value indicating, in the case of the QoS communication distance being not exceeded, the NACK.

In further another implementation, the out-of-range feedback information may be sent by a time-frequency resource for implicitly indicating the out-of-range feedback information.

On one hand, in response to the data receiver sending NACK in the case of incorrectly receiving the data and sending ACK in the case of correctly receiving the data, the out-of-range feedback information may be sent by using a time-frequency resource different from the time-frequency resource for sending, in the case of the QoS communication distance being not exceeded, the ACK and the NACK. For example, in the case that the data receiver determines that the geographical distance between the data receiver and the data transmitter does not exceed the QoS communication distance, ACK or NACK feedback information is sent in the time-frequency resource 1. In the case that the data receiver determines that the geographical distance between the data receiver and the data transmitter exceeds the QoS communication distance, the out-of-range feedback information is sent in the time-frequency resource 2. On the other hand, in response to the data receiver sending NACK in the case of incorrectly receiving the data and sending ACK in the case of correctly receiving the data, the time-frequency resource for implicitly indicating the out-of-range feedback information may be the same as the time-frequency resource for sending, in the case of the QoS communication distance being not exceeded, the ACK. On the other hand, in a case that the data receiver sends NACK in the case of incorrectly receiving the data and does not send any feedback in the case of correctly receiving the data, the time-frequency resource for implicitly indicating the out-of-range feedback information is different from the time-frequency resource for sending, in the case of the QoS communication distance being not exceeded, the NACK.

In further another implementation, the out-of-range feedback information involved in the disclosure may be configured to indicate that the geographical distance between the data receiver and the data transmitter exceeds the QoS communication distance, or indicate whether the data is correctly received in the case that the geographical distance between the data receiver and the data transmitter exceeds the QoS communication distance, and the out-of-range feedback information may include: out-of-range ACK feedback information or out-of-range NACK feedback information. The out-of-range ACK feedback information is configured to indicate that the geographical distance between the data receiver and the data transmitter exceeds the QoS communication distance, and the data is correctly received. The out-of-range NACK feedback information is configured to indicate that the geographical distance between the data receiver and the data transmitter exceeds the QoS communication distance, and the data is not correctly received. In the disclosure, the out-of-range ACK feedback information and the out-of-range NACK feedback information may be indicated by using two different base sequences, two different cyclic shift values, two different bit values (such as "10"/"11"), or ACK and NACK feedback in time-frequency resource 2.

In further another implementation, sending of the out-of-range feedback information is canceled in response to the quantity of continuously-sent out-of-range feedbacks exceeding a set quantity; or sending of the out-of-range feedback information is canceled in response to all of the feedbacks sent in a set time period before a current time are the out-of-range feedbacks. The set quantity and the set time period are preconfigured through system information or higher layer signaling.

In the disclosure, the data receiver may judge whether to send current out-of-range feedback according to feedback content of previous data transmission, so as to reduce possible interference. For example, the data receiver has continuously fed back K out-of-range feedbacks, and thus sending of the out-of-range feedback information may be canceled. Or current estimated feedback information sending time is set to be t, the data receiver checks feedbacks from t-T to the current time period; in the case that there are feedbacks in this time period and all the feedbacks are the "out-of-range feedbacks" or latest feedback is the "out-of-range feedback", sending of the out-of-range feedback information may be canceled. The value of K or T may be a fixed value, or a value preconfigured in vehicle-mounted equipment, or a value configured through a downlink signaling of network equipment.

Data transmission corresponding to the currently-sent out-of-range feedback is data transmission of the same QoS level or logical channel of the same transmitter as completed data transmission.

In the disclosure, after the data receiver sends feedback information, the data transmitter may detect the out-of-range feedback information, and determines whether to resend the data according to an out-of-range feedback information detection result. In the case that the out-of-range feedback information is detected by the data transmitter, it may be determined that the geographical distance between the data receiver and the data transmitter exceeds the QoS communication distance, thus the data may not be resent, reducing the likelihood of resending the data in the case that the data does not need to be resent.

Figure 3:
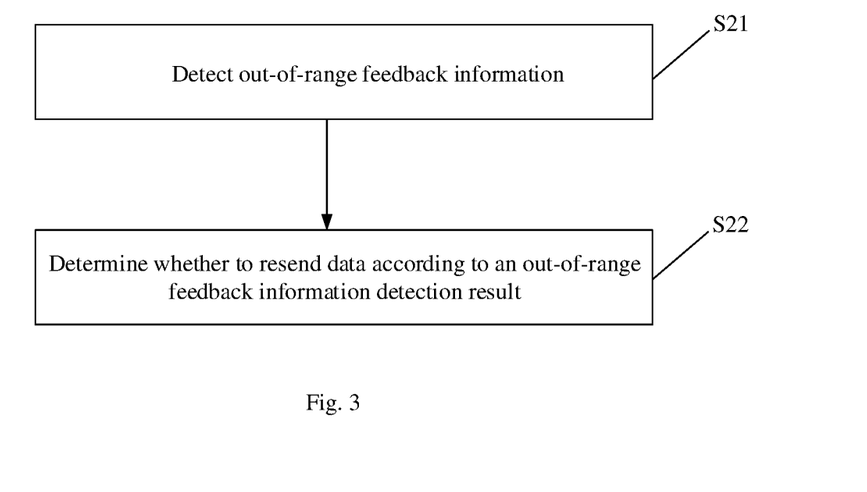
FIG. 3 is a flow diagram of another feedback method according to an example.

FIG. 3 is a flow diagram of a feedback method according to an example. As shown in FIG. 3, the feedback method is applied in a data transmitter, and includes the following step S21 and step S22.

In step S21, out-of-range feedback information is detected.

In the disclosure, the out-of-range feedback information is configured to indicate that geographical distance between a data receiver and the data transmitter exceeds quality of service (QoS) communication distance. The data transmitter may determine whether to resend data by detecting the out-of-range feedback information.

In the disclosure, the data transmitter may detect the out-of-range feedback information based on a physical layer sequence. The physical layer sequence is a base sequence, or the physical layer sequence is a sequence generated by cyclic shift of the base sequence. In response to the data receiver sending NACK in the case of incorrectly receiving the data and sending ACK in the case of correctly receiving the data, the physical layer sequence for indicating the out-of-range feedback information is different from the physical layer sequence for sending the ACK and the NACK, or is the same as the physical layer sequence for sending the ACK. In response to the data receiver sending NACK in the case of incorrectly receiving the data, the physical layer sequence for indicating the out-of-range feedback information is different from the physical layer sequence for sending the NACK.

In the disclosure, the data transmitter may also detect the out-of-range feedback information based on a bit value of a modulation symbol. In response to the data receiver sending NACK in the case of incorrectly receiving the data and sending ACK in the case of correctly receiving the data, the bit value for indicating the out-of-range feedback information is different from the bit value indicating, in the case of the QoS communication distance being not exceeded, the ACK and the NACK, or is the same as the bit value indicating, in the case of the QoS communication distance being not exceeded, the ACK. In response to the data receiver sending a negative acknowledgement (NACK) in the case of incorrectly receiving the data, the bit value for indicating the out-of-range feedback information is different from the bit value indicating, in the case of the QoS communication distance being not exceeded, the NACK.

In the disclosure, the data transmitter may further detect the out-of-range feedback information by a time-frequency resource for implicitly indicating the out-of-range feedback information. In response to the data receiver sending NACK in the case of incorrectly receiving the data and sending ACK in the case of correctly receiving the data, the time-frequency resource for implicitly indicating the out-of-range feedback information is different from the time-frequency resource for sending, in the case of the QoS communication distance being not exceeded, the ACK and the NACK, or the time-frequency resource for implicitly indicating the out-of-range feedback information is the same as the time-frequency resource for sending, in the case of the QoS communication distance being not exceeded, the ACK. In response to the data receiver sending NACK in the case of incorrectly receiving the data, the time-frequency resource for implicitly indicating the out-of-range feedback information is different from the time-frequency resource for sending, in the case of the QoS communication distance being not exceeded, the NACK.

It may be understood that, in the disclosure, the physical layer time/frequency/code resource used by the data receiver to feed back the out-of-range feedback information may be obtained from a physical layer data transmission resource location corresponding to the feedback information in combination with other information through a certain implicit corresponding relationship, may also be indicated by the data transmitter in corresponding control information transmission, or be obtained through other methods. The data transmitter may determine the physical layer time/frequency/code resource used by the data receiver to feed back the out-of-range feedback information via the same implicit corresponding relationship or its own scheduling, and performs related detection and receiving on the related resource. The method for selecting feedback resource by the data transmitter and/or the data receiver is not limited in the disclosure.

In step S22, whether to resend the data is determined according to an out-of-range feedback information detection result.

In one implementation, in the case that the out-of-range feedback information is detected, it is determined that the data does not need to be resent.

In another implementation, in the case that the out-of-range feedback information is not detected, it is determined that the data needs to be resent or it is determined that the data does not need to be resent. In the disclosure, the situation that the out-of-range feedback information is not detected by the data transmitter may be interpreted as that any feedback information sent by the data receiver is not detected by the data transmitter. In the case that the out-of-range feedback information is not detected by the data transmitter, the data transmitter resends the data all the time.

In the case that the data receiver outside the range of the QoS communication distance does not correctly receive the control information corresponding to the data, there will be redundant repeated transmission. In the disclosure, In the case that the out-of-range feedback information is not detected by the data transmitter, the data transmitter resends the data according to the same processing manner as receiving ACK all the time, and thus a packet loss phenomenon exists in the case that the data receiver within the range of the QoS communication distance does not correctly receive the control information corresponding to the data.

In further another implementation, in the case that the data receiver determines whether to send the out-of-range feedback information according to the sent feedback information, the data transmitter may determine whether to resend the data according to the feedback information sent by the same data receiver, or processes according to the processing manner of receiving ACK. It is determined that the data does not need to be resent in the case that the out-of-range feedback information is not detected and the quantity of detected out-of-range feedbacks continuously sent by the same data receiver exceeds a set quantity. Or it is determined that the data does not need to be resent in the case that the out-of-range feedback information is not detected and all of the detected feedbacks sent by the same data receiver in a set time period before a current time are the out-of-range feedbacks. The set quantity and the set time period are preconfigured through system information or higher layer signaling.

Data transmission corresponding to the detected out-of-range feedbacks of the same data receiver is feedbacks corresponding to data transmission of the same QoS level or logical channel of the same transmitter as the currently-detected out-of-range feedback.

In the disclosure, the data transmitter detects the out-of-range feedback information and determines whether to resend the data according to the out-of-range feedback information detection result. In the case that the out-of-range feedback information is detected by the data transmitter, it may be determined that the geographical distance between the data receiver and the data transmitter exceeds the QoS communication distance, thus the data may not be resent, reducing the likelihood of resending the data in the case that the data does not need to be resent.

Figure 4:
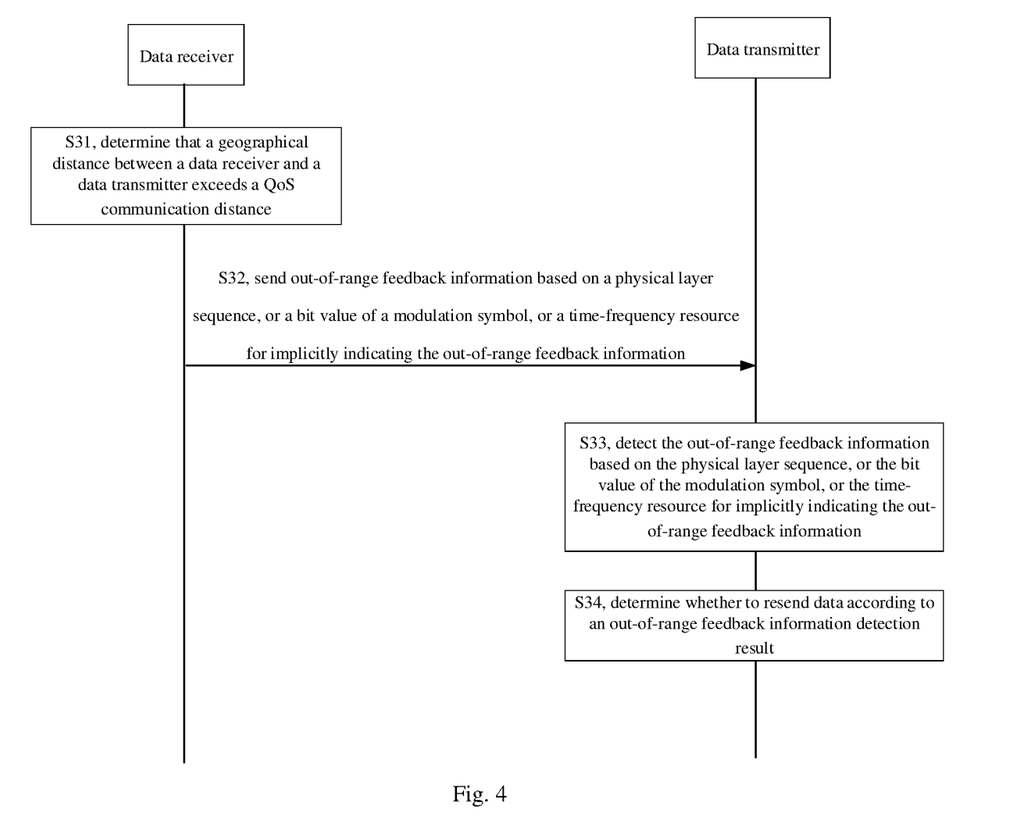
FIG. 4 is a flow diagram of further another feedback method according to an example.

FIG. 4 is a flow diagram of a feedback method according to an example. As shown in FIG. 4, the feedback method is a method of interaction between a data transmitter and a data receiver, and includes the following step S31 and step S32.

In step S31, the data receiver determines whether geographical distance between the data receiver and the data transmitter exceeds QoS communication distance, and in the case that the geographical distance exceeds the QoS communication distance, step S32 is executed.

In step S32, the data receiver sends out-of-range feedback information, and the out-of-range feedback information is configured to indicate that the geographical distance between the data receiver and the data transmitter exceeds the QoS communication distance.

The data receiver may send the out-of-range feedback information based on a physical layer sequence, or a bit value of a modulation symbol, or a time-frequency resource for implicitly indicating the out-of-range feedback information.

In response to the data receiver feeding back ACK in the case of correctly receiving data and feeding back NACK in the case of incorrectly receiving the data, a physical layer sequence/bit value/time-frequency resource used by the outof-range feedback information may be a physical layer sequence/bit value/time-frequency resource different from ACK and NACK, or may be the same physical layer sequence/bit value/time-frequency resource as ACK. In response to the data receiver feeding back NACK in the case of incorrectly receiving data and does not feedback in the case of correctly receiving the data, the physical layer sequence/bit value/time-frequency resource used by the out-of-range feedback information may be a physical layer sequence/bit value/time-frequency resource different from NACK.

In step S33, the data transmitter detects the out-of-range feedback information.

The data transmitter may detect the out-of-range feedback information by adopting the same resource as the resource adopted by the data receiver to send the out-of-range feedback information. For example, the data transmitter may detect the out-of-range feedback information based on a physical layer sequence, or a bit value of a modulation symbol, or a time-frequency resource for implicitly indicating the out-of-range feedback information.

In step S34, the data transmitter determines whether to resend data according to an out-of-range feedback information detection result.

In the disclosure, in the case that the out-of-range feedback information is detected by the data transmitter, it may be determined that the geographical distance between the data receiver and the data transmitter exceeds the QoS communication distance, thus the data may not be resent, reducing the likelihood of resending the data in the case that the data does not need to be resent.

In the disclosure, in the case that the out-of-range feedback information is not detected by the data transmitter, it is determined that the data needs to be resent or it is determined that the data does not need to be resent.

Further, in the disclosure, it is determined that the data does not need to be resent in the case that the out-of-range feedback information is not detected by the data transmitter and the quantity of detected out-of-range feedbacks continuously sent by the same data receiver exceeds a set quantity. Or it is determined that the data does not need to be resent in the case that the out-of-range feedback information is not detected and all of the detected feedbacks sent by the same data receiver in a set time period before a current time are out-of-range feedbacks. The set quantity and the set time period are preconfigured through system information or higher layer signaling.

Based on the same concept, an example of the disclosure further provides a feedback apparatus.

It may be understood that in order to implement the above functions, the feedback method and apparatus provided by the examples of the disclosure include corresponding hardware structures and/or software modules for executing all the functions. With reference to units and steps of an algorithm of all examples disclosed in the examples of the disclosure, the examples of the disclosure may be implemented in a form of hardware or a form of combining the hardware with computer software. Whether a certain function is executed in a hardware manner or in a manner that the computer software drives the hardware depends on specific applications and design constraints of the technical solution. Those skilled in the art may use different methods for each specific application to implement the described function, but such implementation should not be considered beyond the scope of the technical solution of the examples of the disclosure.

Figure 5:
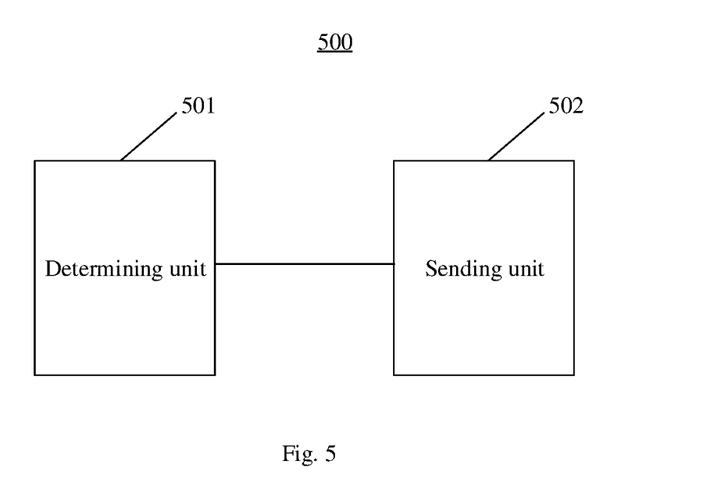
FIG. 5 is a block diagram of a feedback apparatus according to an example.

FIG. 5 is a block diagram of a feedback apparatus 500 according to an example of the disclosure, and the feedback apparatus 500 may be applied to a data receiver. Referring to FIG. 5, the feedback apparatus 500 is applied to the data receiver and includes a determining unit 501 and a sending unit 502. The determining unit 501 is configured to determine that geographical distance between the data receiver and a data transmitter exceeds QoS communication distance. The sending unit 502 is configured to send out-of-range feedback information, and the out-of-range feedback information is configured to indicate that the geographical distance between the data receiver and the data transmitter exceeds the QoS communication distance.

In one implementation, the sending unit 502 is configured to send the out-of-range feedback information based on a physical layer sequence.

In response to the data receiver sending NACK in the case of incorrectly receiving data and sending ACK in the case of correctly receiving the data, the physical layer sequence is different from a physical layer sequence for sending the ACK and the NACK, or the physical layer sequence is the same as a physical layer sequence for sending the ACK. In response to the data receiver sending NACK in the case of incorrectly receiving the data, the physical layer sequence is different from a physical layer sequence for sending the NACK.

The physical layer sequence is a base sequence, or the physical layer sequence is a sequence generated by cyclic shift of the base sequence.

In another implementation, the sending unit 502 is configured to send the out-of-range feedback information based on a bit value of a modulation symbol.

In response to the data receiver sending NACK in the case of incorrectly receiving data and sending ACK in the case of correctly receiving the data, the bit value is different from a bit value indicating, in the case of the QoS communication distance being not exceeded, the ACK and the NACK, or the bit value is the same as a bit value indicating, in the case of the QoS communication distance being not exceeded, the ACK. In response to the data receiver sending NACK in the case of incorrectly receiving the data, the bit value is different from a bit value indicating, in the case of the QoS communication distance being not exceeded, the NACK.

In further another implementation, the sending unit 502 is configured to send the out-of-range feedback information by a time-frequency resource for implicitly indicating the out-of-range feedback information.

In response to the data receiver sending NACK in the case of incorrectly receiving data and sending ACK in the case of correctly receiving the data, the time-frequency resource is different from a time-frequency resource for sending, in the case of the QoS communication distance being not exceeded, the ACK and the NACK, or the time-frequency resource is the same as a time-frequency resource for sending, in the case of the QoS communication distance being not exceeded, the ACK. In response to the data receiver sending NACK in the case of incorrectly receiving the data, the time-frequency resource is different from a time-frequency resource for sending, in the case of the QoS communication distance being not exceeded, the NACK.

In further another implementation, the out-of-range feedback information includes: out-of-range ACK feedback information or out-of-range NACK feedback information.

The out-of-range ACK feedback information is configured to indicate that the geographical distance between the data receiver and the data transmitter exceeds the QoS communication distance, and the data is correctly received.

The out-of-range NACK feedback information is configured to indicate that the geographical distance between the data receiver and the data transmitter exceeds the QoS communication distance, and the data is not correctly received.

In further another implementation, the sending unit 502 is further configured to: cancel sending of the out-of-range feedback information in response to the quantity of continuously-sent out-of-range feedbacks exceeding a set quantity. Or the sending unit 502 is further configured to: cancel sending of the out-of-range feedback information in response to all of the feedbacks sent in a set time period before a current time are the out-of-range feedbacks.

The set quantity and the set time period are preconfigured through system information or higher layer signaling.

Data transmission corresponding to the out-of-range feedbacks is data transmission of the same QoS level or logical channel of the same transmitter as completed data transmission.

Figure 6:
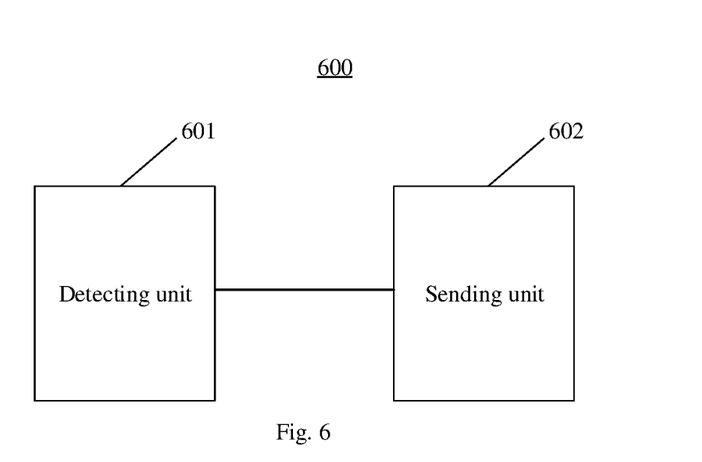
FIG. 6 is a block diagram of another feedback apparatus according to an example.

FIG. 6 is a block diagram of a feedback apparatus 600 according to an example of the disclosure, and the feedback apparatus 600 may be applied to a data transmitter. Referring to FIG. 6, the feedback apparatus 600 is applied to the data transmitter and includes a detecting unit 601 and a sending unit 602. The detecting unit 601 is configured to detect out-of-range feedback information, and the out-of-range feedback information is configured to indicate that geographical distance between a data receiver and the data transmitter exceeds quality of service (QoS) communication distance. The sending unit 602 is configured to determine whether to resend data according to an out-of-range feedback information detection result.

In one implementation, the sending unit 602 is configured to: determine that the data does not need to be resent in the case that the out-of-range feedback information is detected.

In another implementation, the sending unit 602 is configured to: determine that the data needs to be resent or determine that the data does not need to be resent, in the case that the out-of-range feedback information is not detected.

In further another implementation, the sending unit 602 is configured to determine whether to resend the data according to the out-of-range feedback information detection result by adopting the following manner:

It is determined that the data does not need to be resent in the case that the out-of-range feedback information is not detected and the quantity of detected out-of-range feedbacks continuously sent by the same data receiver exceeds a set quantity. Or it is determined that the data does not need to be resent in the case that the out-of-range feedback information is not detected and all of the detected feedbacks sent by the same data receiver in a set time period before a current time are out-of-range feedbacks.

The set quantity and the set time period are preconfigured through system information or higher layer signaling.

Data transmission corresponding to the detected out-of-range feedbacks of the same data receiver is feedbacks corresponding to data transmission of the same QoS level or logical channel of the same transmitter as the currently-detected out-of-range feedback.

In further another implementation, the detecting unit 601 is configured to detect the out-of-range feedback information based on a physical layer sequence.

In response to the data receiver sending NACK in the case of incorrectly receiving data and sending ACK in the case of correctly receiving the data, the physical layer sequence is different from the physical layer sequence for sending the ACK and the NACK, or the physical layer sequence is the same as the physical layer sequence for sending the ACK. In response to the data receiver sending NACK in the case of incorrectly receiving the data, the physical layer sequence is different from the physical layer sequence for sending the NACK.

The physical layer sequence is a base sequence, or the physical layer sequence is a sequence generated by cyclic shift of the base sequence.

In further another implementation, the detecting unit 601 is configured to detect the out-of-range feedback information based on a bit value of a modulation symbol.

In response to the data receiver sending NACK in the case of incorrectly receiving data and sending ACK in the case of correctly receiving the data, the bit value is different from the bit value indicating, in the case of the QoS communication distance being not exceeded, the ACK and the NACK, or the bit value is the same as the bit value indicating, in the case of the QoS communication distance being not exceeded, the ACK. In response to the data receiver sending NACK in the case of incorrectly receiving the data, the bit value is different from the bit value indicating, in the case of the QoS communication distance being not exceeded, the NACK.

In further another implementation, the detecting unit 601 is configured to detect the out-of-range feedback information by a time-frequency resource for implicitly indicating the out-of-range feedback information.

In response to the data receiver sending NACK in the case of incorrectly receiving data and sending ACK in the case of correctly receiving the data, the time-frequency resource is different from the time-frequency resource for sending, in the case of the QoS communication distance being not exceeded, the ACK and the NACK, or the time-frequency resource is the same as the time-frequency resource for sending, in the case of the QoS communication distance being not exceeded, the ACK.

In response to the data receiver sending NACK in the case of incorrectly receiving the date, the time-frequency resource is different from the time-frequency resource for sending, in the case of the QoS communication distance being not exceeded, the NACK.

As for the apparatus in the above examples, the specific manner for performing operations by all modules has been described in detail in the examples related to the method, which will not be illustrated in detail here.

Figure 7:
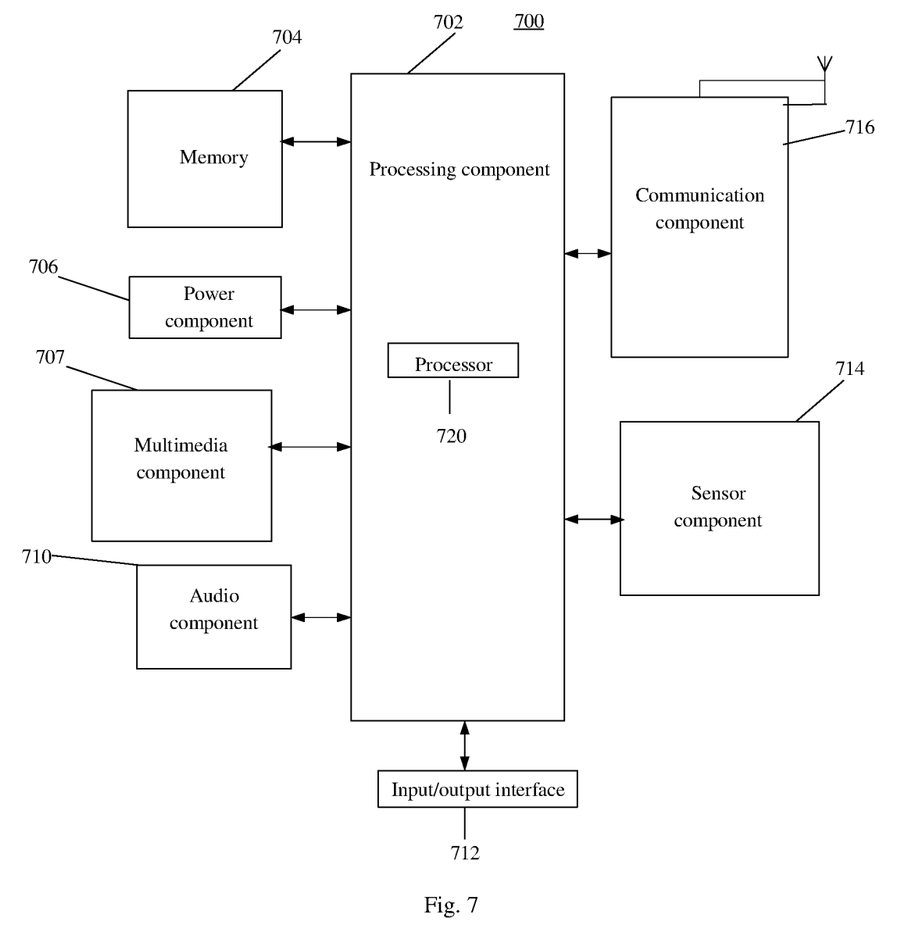
FIG. 7 is a block diagram of an apparatus according to an example.

FIG. 7 is a block diagram of a feedback apparatus 700 according to an example. The feedback apparatus 700 may be applied to a data transmitter or applied to a data receiver. The feedback apparatus 700 may be applied to a terminal, for example, the apparatus 700 may be a mobile phone, a computer, a digital broadcast terminal, a message transceiving equipment, a games console, a tablet equipment, a medical equipment, a fitness equipment, a personal digital assistant, and the like.

Referring to FIG. 7, the apparatus 700 may include one or more of the following components: a processing component 702, a memory 704, a power component 706, a multimedia component 708, an audio component 710, an input/output (I/O) interface 712, a sensor component 714, and a communication component 716.

The processing component 702 generally controls an overall operation of the apparatus 700, such as operations associated with display, telephone call, data communication, camera operation and record operation. The processing component 702 may include one or more processors 820 to execute instructions so as to complete all or part of steps of the above method. In addition, the processing component 702 may include one or more modules, facilitating interaction between the processing component 702 and other components. For example, the processing component 702 may include a multimedia module, so as to facilitate interaction between the multimedia component 708 and the processing component 702.

The memory 704 is configured to store all types of data, for example, store instructions executable by processor 820, so as to support the operations on the apparatus 700. Examples of these data include instructions of any application program or method used to be operated on the apparatus 700, a contact data, a telephone directory data, a message, a picture, a video, and the like. The memory 704 may be implemented by any type of volatile or nonvolatile storage equipment or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disc or an optical disc.

The power component 706 provides electric power for various components of the apparatus 700. The power component 706 may include a power source management system, one or more power sources, and other components associated with generating, managing and distributing the electric power for the apparatus 700.

The multimedia component 708 includes a screen providing an output interface between the apparatus 700 and a user. In some examples, the screen may include a liquid crystal display (LCD) and a touch panel (TP). In the case that the screen includes the touch panel, the screen may be implemented as a touch screen, so as to receive an input signal from the user. The touch panel includes one or more touch sensors so as to sense touch, sliding or gestures on the touch panel. The touch sensor may sense a boundary of a touch or sliding motion, and further detects a duration and pressure related to a touch or sliding operation. In some examples, the multimedia component 708 includes a front camera and/or a rear camera. When the apparatus 700 is in an operation mode, such as a shooting mode or a video mode, the front camera and/or the rear camera may receive external multimedia data. Each of the front camera and/or the rear camera may be a fixed optical lens system or has a focal length and optical zoom capability.

The audio component 710 is configured to output and/or input an audio signal. For example, the audio component 710 includes a microphone (MIC), and when the apparatus 700 is in an operation mode, such as a calling mode, a record mode and a voice recognition mode, the microphone is configured to receive an external audio signal. The received audio signal may be further stored in the memory 704 or be sent by the communication component 716. In some examples, the audio component 710 further includes a loudspeaker, configured to output the audio signal.

The I/O interface 712 provides an interface between the processing component 702 and a peripheral interface module, and the above peripheral interface module may be a keyboard, a click wheel, buttons, and the like. The buttons include but are not limited to: a home button, a volume button, a start button and a locking button.

The sensor component 714 includes one or more sensors, and is configured to provide all aspects of state evaluation for the apparatus 700. For example, the sensor component 714 may detect an on/off state of the apparatus 700, and relative positioning of the components, for example, the component is a displayer and a keypad of the apparatus 700. The sensor component 714 may further detect the apparatus 700 or detect location change of one component of the apparatus 700, presence or absence of contact between a user and the apparatus 700, orientation or acceleration/deceleration of the apparatus 700, and temperature change of the apparatus 700. The sensor component 714 may include a proximity detector, configured to detect presence of a nearby object in the absence of any physical contact. The sensor component 714 may further include an optical sensor, such as a CMOS or a CCD image sensor, configured to be used in imaging application. In some examples, the sensor component 714 may further include an acceleration sensor, a gyroscope sensor, a magnetic sensor, a pressure sensor or a temperature sensor.

A communication component 716 is configured to facilitate wired or wireless communication between the apparatus 700 and other equipment. The apparatus 700 may have access to a wireless network based on a communication standard, such as WiFi, 2G or 3G, or their combination. In one example, the communication component 716 receives a broadcast signal or broadcast related information from an external broadcast management system through a broadcast channel. In one example, the communication component 716 further includes a near-field communication (NFC) module, so as to promote short-range communication. For example, the NFC module can be implemented based on radio frequency identification (RFID) technology, infrared data association (IrDA) technology, ultra wide band (UWB) technology, Bluetooth (BT) technology and other technologies.

In an example, the apparatus 700 may be implemented by one or more application specific integrated circuits (ASIC), digital signal processors (DSP), digital signal processing devices (DSPD), programmable logic devices (PLD), field-programmable gate arrays (FPGA), controllers, microcontrollers, microprocessors or other electronic elements, and is configured to execute the above methods.

In an example, the apparatus 700 includes a processor 720 and a memory 704 configured to store instructions executable by the processor. The processor 720 is configured to execute the above method.

In an example, a non-transitory computer readable storage medium including instructions is further provided, for example, a memory 704 including the instructions, and the above instructions may be executed by the processor 720 of the apparatus 700 so as to complete the above method. For example, the non-transitory computer readable storage medium may be an ROM, a random access memory (RAM), a CD-ROM, a magnetic tape, a floppy disk, optical data storage equipment, and the like.

It should be understood that in the disclosure, the "network" and the "system", as well as the "out-of-range feedback information" and the "out-of-range feedback" are used alternately sometimes, but those skilled in the art may understand its meaning.

It may be further understood that in the disclosure, "the plurality of" refers to two or more, and other quantifiers are similar to it. "And/or" describes an association relationship of an association object, and represents that there may be three kinds of relationships, for example, A and/or B, may represent: A exists alone, A and B exist at the same time, and B exists alone. A character "/" generally represents that the previous and next association objects are in an "or" relationship. "One", "said" and "such" in a singular form also aim at including the plural form, unless the context clearly indicates other meanings.

It may be further understood that the terms "first" and "second" are used for describing various information, but this information should not be limited to these terms. These terms are only used for distinguishing the same type of information, and do not indicate specific order or importance. Actually, the expression such as "first" and "second" completely may be used interchangeably. For example, in the case of not departing from the scope of the disclosure, the first information may also be called the second information, and similarly, the second information may also be called the first information.

It may be understood that in the examples of the disclosure, although the operations are described in a specific order in the drawings, it should not be understood that these operations are required to be executed according to the shown specific order or serial order, or all the shown operations are required to be executed so as to obtain an expected result. In a specific environment, multitask and parallel processing may be advantageous.

Those skilled in the art will easily think of other implementation solutions of the disclosure after considering the specification and practicing the invention disclosed herein. The present application is intended to cover any variations, uses, or adaptive changes of the disclosure. These variations, uses, or adaptive changes follow the general principles of the disclosure and include common knowledge or conventional technical means, not disclosed in the disclosure, in the technical field. The specification and the examples are only regarded as exemplary, and the true range and spirit of the disclosure are pointed out by the following claims.

It will be appreciated that the disclosure is not limited to the exact construction that has been described above and illustrated in the accompanying drawings, and that various modifications and changes may be made without departing from the scope thereof. It is intended that the scope of the disclosure only be limited by the appended claims.

The invention claimed is:

1. A feedback method, applied to a data receiver, and comprising:
    determining that a geographical distance between the data receiver and a data transmitter exceeds a quality of service (QOS) communication distance; and
    sending out-of-range feedback information, wherein the out-of-range feedback information is configured to indicate that the geographical distance between the data receiver and the data transmitter exceeds the QoS communication distance;
    wherein sending the out-of-range feedback information comprises at least one of:
        sending the out-of-range feedback information based on a physical layer sequence;
        sending the out-of-range feedback information based on a bit value of a modulation symbol; or
        sending the out-of-range feedback information by a time-frequency resource for implicitly indicating the out-of-range feedback information.

2. The feedback method according to claim 1, wherein
    in response to the data receiver sending a negative acknowledgement (NACK) in a case of incorrectly receiving data and sending an acknowledgement (ACK) in a case of correctly receiving the data, the physical layer sequence is different from a physical layer sequence for sending the ACK and the NACK, or the physical layer sequence is the same as a physical layer sequence for sending the ACK; and
    in response to the data receiver sending the NACK in the case of incorrectly receiving the data, the physical layer sequence is different from a physical layer sequence for sending the NACK.

3. The feedback method according to claim 2, wherein the physical layer sequence is a base sequence, or the physical layer sequence is a sequence generated by cyclic shift of the base sequence.

4. The feedback method according to claim 1, wherein
    in response to the data receiver sending a negative acknowledgement (NACK) in a case of incorrectly receiving data and sending an acknowledgement (ACK) in a case of correctly receiving the data, the bit value is different from a bit value indicating, in the case of the QoS communication distance being not exceeded, the ACK and the NACK, or the bit value is the same as a bit value indicating, in the case of the QoS communication distance being not exceeded, the ACK; and
    in response to the data receiver sending the NACK in the case of incorrectly receiving the data, the bit value is different from a bit value indicating, in the case of the QoS communication distance being not exceeded, the NACK.

5. The feedback method according to claim 1, wherein
    in response to the data receiver sending a negative acknowledgement (NACK) in a case of incorrectly receiving the data and sending an acknowledgement (ACK) in a case of correctly receiving the data, the time-frequency resource is different from a time-frequency resource for sending, in the case of the QoS communication distance being not exceeded, the ACK and the NACK, or the time-frequency resource is the same as a time-frequency resource for sending, in the case of the QoS communication distance being not exceeded, the ACK; and
    in response to the data receiver sending the NACK in the case of incorrectly receiving the data, the time-frequency resource is different from a time-frequency resource for sending, in the case of the QoS communication distance being not exceeded, the NACK.

6. The feedback method according to claim 1, wherein the out-of-range feedback information comprises:
    out-of-range ACK feedback information or out-of-range NACK feedback information;
    the out-of-range ACK feedback information is configured to indicate that the geographical distance between the data receiver and the data transmitter exceeds the QoS communication distance, and data is correctly received; and
    the out-of-range NACK feedback information is configured to indicate that the geographical distance between the data receiver and the data transmitter exceeds the QoS communication distance, and the data is not correctly received.

7. The feedback method according to claim 1, further comprising:
    in response to a quantity of continuously-sent out-of-range feedbacks exceeding a set quantity, canceling sending of the out-of-range feedback information; or
    in response to all of the feedbacks sent in a set time period before a current time are the out-of-range feedbacks, canceling sending of the out-of-range feedback information.

8. The feedback method according to claim 7, wherein the set quantity and the set time period are preconfigured through system information or higher layer signaling.

9. The feedback method according to claim 7, wherein data transmission corresponding to the out-of-range feedbacks is data transmission of the same QoS level or logical channel of the same transmitter as completed data transmission.

10. A feedback method, applied to a data transmitter, and comprising:
    detecting out-of-range feedback information, wherein the out-of-range feedback information is configured to indicate that a geographical distance between a data receiver and the data transmitter exceeds a quality of service (QOS) communication distance; and
    determining whether to resend data according to an out-of-range feedback information detection result;
    wherein detecting the out-of-range feedback information comprises at least one of:
        detecting the out-of-range feedback information based on a physical layer sequence;
        detecting the out-of-range feedback information based on a bit value of a modulation symbol; or
        detecting the out-of-range feedback information by a time-frequency resource for implicitly indicating the out-of-range feedback information.

11. The feedback method according to claim 10, wherein determining whether to resend the data according to the out-of-range feedback information detection result comprises:
    determining that the data does not need to be resent in a case that the out-of-range feedback information is detected.

12. The feedback method according to claim 10, wherein determining whether to resend the data according to the out-of-range feedback information detection result comprises:
    in a case that the out-of-range feedback information is not detected, determining that the data needs to be resent or determining that the data does not need to be resent.

13. The feedback method according to claim 10, wherein determining whether to resend the data according to the out-of-range feedback information detection result, comprises:
    determining that the data does not need to be resent, in a case that the out-of-range feedback information is not detected and a quantity of detected out-of-range feedbacks continuously sent by the same data receiver exceeds a set quantity; or
    determining that the data does not need to be resent, in a case that the out-of-range feedback information is not detected and all of the detected feedbacks sent by the same data receiver in a set time period before a current time are out-of-range feedbacks.

14. The feedback method according to claim 13, wherein the set quantity and the set time period are preconfigured through system information or higher layer signaling.

15. The feedback method according to claim 13, wherein data transmission corresponding to the detected out-of-range feedbacks of the same data receiver is feedbacks corresponding to data transmission of the same QoS level or logical channel of the same transmitter as the currently-detected out-of-range feedback.

16. The feedback method according to claim 10, wherein
    in response to the data receiver sending a negative acknowledgement (NACK) in a case of incorrectly receiving the data and sending an acknowledgement (ACK) in a case of correctly receiving the data, the physical layer sequence is different from a physical layer sequence for sending the ACK and the NACK, or the physical layer sequence is the same as a physical layer sequence for sending the ACK; and
    in response to the data receiver sending the NACK in the case of incorrectly receiving the data, the physical layer sequence is different from a physical layer sequence for sending the NACK.

17. The feedback method according to claim 16, wherein the physical layer sequence is a base sequence, or the physical layer sequence is a sequence generated by cyclic shift of the base sequence.

18. The feedback method according to claim 10, wherein
    in response to the data receiver sending a negative acknowledgement (NACK) in a case of incorrectly receiving the data and sending an acknowledgement (ACK) in a case of correctly receiving the data, the bit value is different from a bit value indicating, in the case of the QoS communication distance being not exceeded, the ACK and the NACK, or the bit value is the same as a bit value indicating, in the case of the QoS communication distance being not exceeded, the ACK; and
    in response to the data receiver sending the NACK in the case of incorrectly receiving the data, the bit value is different from a bit value indicating, in the case of the QoS communication distance being not exceeded, the NACK.

19. The feedback method according to claim 10, wherein
    in response to the data receiver sending a negative acknowledgement (NACK) in a case of incorrectly receiving the data and sending an acknowledgement (ACK) in a case of correctly receiving the data, the time-frequency resource is different from a time-frequency resource for sending, in the case of the QoS communication distance being not exceeded, the ACK and the NACK, or the time-frequency resource is the same as a time-frequency resource for sending, in the case of the QoS communication distance being not exceeded, the ACK; and
    in response to the data receiver sending the NACK in the case of incorrectly receiving the data, the time-frequency resource is different from a time-frequency resource for sending, in the case of the QoS communication distance being not exceeded, the NACK.

20. A data transmission system, comprising: a data transmitter and a data receiver, wherein:
    the data receiver is configured to determine that a geographical distance between the data receiver and a data transmitter exceeds a quality of service (QOS) communication distance, and send out-of-range feedback information, wherein the out-of-range feedback information is configured to indicate that the geographical distance between the data receiver and the data transmitter exceeds the QoS communication distance; and
    the data transmitter is configured to determine to stop resending the data when receiving the out-of-range feedback information;
    wherein sending the out-of-range feedback information comprises at least one of:
        sending the out-of-range feedback information based on a physical layer sequence;
        sending the out-of-range feedback information based on a bit value of a modulation symbol; or
        sending the out-of-range feedback information by a time-frequency resource for implicitly indicating the out-of-range feedback information.

* * * * *